United States Patent Office 3,149,220
Patented Sept. 15, 1964

3,149,220
INERT-GAS SHIELDED ARC WELDING METHOD
Pierre Soulary, Croissy-sur-Seine, and Pierre Regnauld, Le Vesinet, France, assignors to L'Air Liquide, Société Anonyme pour l'Etude et l'Exploitation des Procedes Georges Claude, Paris, France
No Drawing. Filed June 24, 1957, Ser. No. 667,698
Claims priority, application France July 6, 1956
2 Claims. (Cl. 219—74)

The present invention relates to inert gas shielded arc welding with a fusible electrode. This type of welding is appreciated in view, particularly, of the quality of the joints obtained, of its rapidity, its convenience and the absence of slag.

However, owing to the relatively high cost of purified argon, generally used as a protective atmosphere, its use has been more or less restricted to the welding of light alloys and stainless steels.

None the less, some applications made in mild steel welding, in particular cases where a sufficient latitude was allowed for cost, showed that the advantages set forth above could be obtained also in the welding of mild steels. In some cases, these advantages amply balance the increased cost of welding supplies.

The present invention has mainly for object, to extend the field of utilization of gas-shielded welding to ordinary welding operations, involving common mild steels, while preserving the advantages set forth above but lowering the cost very substantially.

At the present time, the cost of argon is increased more particularly by the necessity of subjecting it to a very thorough purification, to make it suitable for the welding of light alloys and stainless steels.

In the welding of ordinary steels, the troublesome impurities are not the same as in the welding of aluminum alloys. Oxygen, in particular, is not troublesome and it is even added in small proportions, for improving certain qualities of mild steel welding. On the contrary, the presence of nitrogen in argon, even in very small amounts of less than 1% causes an excessive porosity of mild steel welded joints. It would seem, that welding under a protective atmosphere is more subject to porosities than welding with a flux, for instance with coated electrodes, in which the presence of slag slows down the solidification of the metal and helps the release of gases dissolved in the molten metal.

This tendency to porosity prevents the use of raw argon as it comes out of the distillation columns, and requires a costly operation of purification for eliminating nitrogen.

In presence of this difficulty, recourse was had to gases or gas mixtures less costly than argon, but these offered, in practice, drawbacks which considerably limit their fields of application. It is known, in particular, that pure $CO_2$ makes it necessary to maintain an extremely short arc, which cannot be used for manual welding and which is not very satisfactory for automatic welding, in which the numerous metal drops projected obstruct the gas nozzle very rapidly, which is detrimental to an economical use of the process. On the other hand, trials with mixtures of $CO_2$ and argon have shown that for avoiding the above drawbacks, argon must predominate largely in the mixture, which does not allow a substantial saving on the cost of the mixture with respect to pure argon.

According to the present invention, a suitable protective gas for the welding of mild steels with a fusible electrode is obtained by using argon taken directly from the distillation columns, containing up to about 0.5% nitrogen and to which from 10 to 25% oxygen or $CO_2$ is added.

While it was practically impossible until now, to weld with argon containing about 0.5% nitrogen, due to the considerable porosities, the present invention makes it possible to obtain welds free of porosities and quite satisfactory in all other respects. X-ray checks have regularly confirmed the absence of porosities.

The arc is as quiet as in extra-pure argon and the length of the arc may be kept at about 4 to 5 millimeters, which allows manual welding.

When $CO_2$ is added to the raw argon, the electrode wires ordinarily used with purified argon are also suitable. The best results were obtained with a wire containing a total of about 1% deoxidizing materials.

When the gas added to raw argon is oxygen, it is necessary to use an electrode wire containing a greater amount of deoxidizing material than for welding with purified argon, for instance about 1% silicon or 0.1 to 0.2% titanium, with or without an addition of other deoxidizing materials such as zirconium or aluminum.

The following wire compositions have also been found appropriate for welding with raw argon to which oxygen is added:

(1) Silicon—from about .8 to 1.2%, with manganese—from about .8 to 1.5%, and with only a very small amount of carbon.

(2) Silicon—from about .3 to .5%, with manganese—from about .5 to 1.5%, and titanium—from about .1 to .2%.

(3) The same as (2), with, in addition: zirconium and/or aluminum—from .1 to .2%.

What we claim is:

1. A composition of arc-shielding gas for welding low-carbon steel with a fusible steel electrode consisting of crude argon containing up to about 0.5% by volume of nitrogen admixed with from 10 to 25% carbon dioxide by volume.

2. A process of electric arc welding comprising producing an arc between a low carbon steel workpiece and a fusible steel electrode and shielding the arc with crude argon containing up to 0.5% by volume of nitrogen admixed with from 10 to 25% by volume of carbon dioxide.

References Cited in the file of this patent
UNITED STATES PATENTS

| | | |
|---|---|---|
| 2,140,238 | Leitner | Dec. 13, 1938 |
| 2,141,996 | Leitner | Dec. 27, 1938 |
| 2,552,176 | Hummitzsch | May 8, 1951 |
| 2,856,509 | Stanchus | Oct. 14, 1958 |
| 2,824,948 | Vander Willigen | Feb. 25, 1958 |
| 2,907,864 | Rothschild | Oct. 6, 1959 |
| 2,908,800 | Breymeier | Oct. 13, 1959 |
| 2,932,721 | Kooistra | Apr. 12, 1960 |

FOREIGN PATENTS

| | | |
|---|---|---|
| 763,052 | Great Britain | Dec. 5, 1956 |

OTHER REFERENCES

"Arc Welding in Controlled Atmospheres," by Doan and Smith, in Welding Research Supplement of March 1940, pages 110–116.